United States Patent

[11] 3,534,681

| [72] | Inventors | Terry L. Beals<br>Akron;<br>Theodore F. Griffin, Barberton, Ohio |
|---|---|---|
| [21] | Appl. No. | 670,202 |
| [22] | Filed | Sept. 25, 1967 |
| [45] | Patented | Oct. 20, 1970 |
| [73] | Assignee | The Goodyear Tire & Rubber Company<br>Akron, Ohio<br>a corporation of Ohio |

[54] TREAD MARKING DEVICE
8 Claims, 7 Drawing Figs.

[52] U.S. Cl. .................................................. 101/37,
118/44, 118/249, 18/10, 18/12, 101/407,
29/113;121;125, 101/248
[51] Int. Cl. .................................................. B41f 17/10
[50] Field of Search .......................................... 101/36, 37,
35, 407, 5, 6, 8, 248(Cursory); 29/113, 121, 125;
254/50.3; 156/(Inquired); 157/(Inquired);
152/(Inquired); 18/12, 10(Inquired); 264/132;
118/44, 249, 205

[56] References Cited
UNITED STATES PATENTS

| 1,440,007 | 12/1922 | Freeman et al. | 18/12X |
| 1,454,058 | 5/1923 | Lowe | 18/12 |
| 1,721,922 | 7/1929 | Roe | 101/37 |
| 1,870,825 | 8/1932 | Sprague | 101/426 |
| 1,992,347 | 2/1935 | Bartlett | 101/37 |
| 2,491,947 | 12/1949 | Bardash | 101/35 |
| 2,892,212 | 6/1959 | Rhodes | 18/12 |
| 2,954,962 | 10/1960 | Sorrick | 254/50.3 |
| 3,068,785 | 12/1962 | Ahlburg | 101/37 |
| 3,083,636 | 4/1963 | Carkhuff | 101/37 |
| 3,136,242 | 6/1964 | Gemelli | 101/37 |
| 2,424,606 | 7/1947 | Engler | 101/35UX |
| 3,161,127 | 12/1964 | Lime | 101/248X |

Primary Examiner—Robert E. Pulfrey
Assistant Examiner—Clifford D. Crowder
Attorneys—F. W. Brunner and R. S. Washburn ABSTRACT: The transversely curved surface of extruded tire tread stock is printed with large identifying symbols, so large as to extend across the surface from shoulder hump to shoulder hump and repeated along its length by an inked printing wheel. The curved surface to be printed is displaced to a flat printable surface by a backup roll having a distensible elastic fluid pressure filled cylindrical membrane over a part of the length of the roll so that the tread stock is temporarily displaced and the surface brought into printing contact with the wheel by the fluid pressure.

INVENTORS
TERRY L. BEALS
THEODORE F. GRIFFIN

INVENTORS
TERRY L. BEALS
THEODORE F. GRIFFIN

Patented Oct. 20, 1970
3,534,681
Sheet 3 of 3
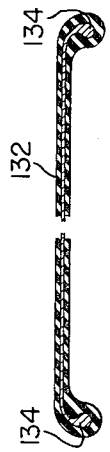
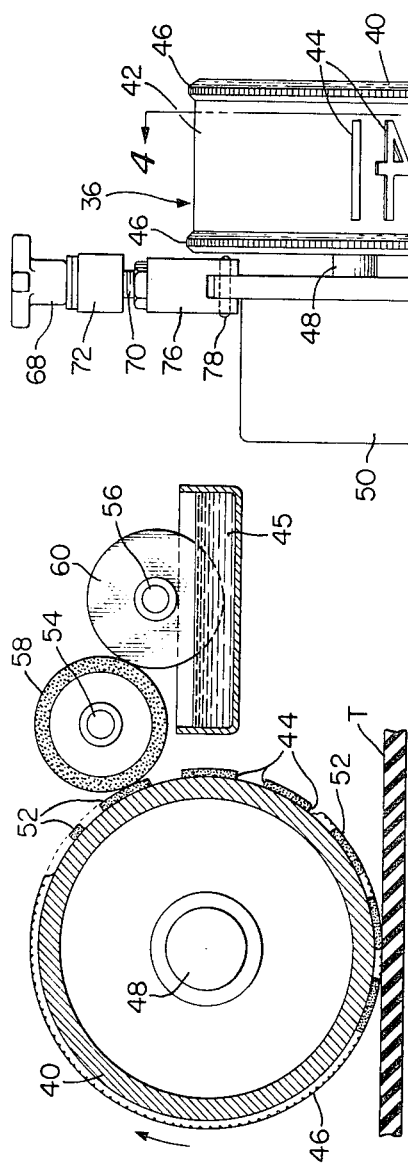
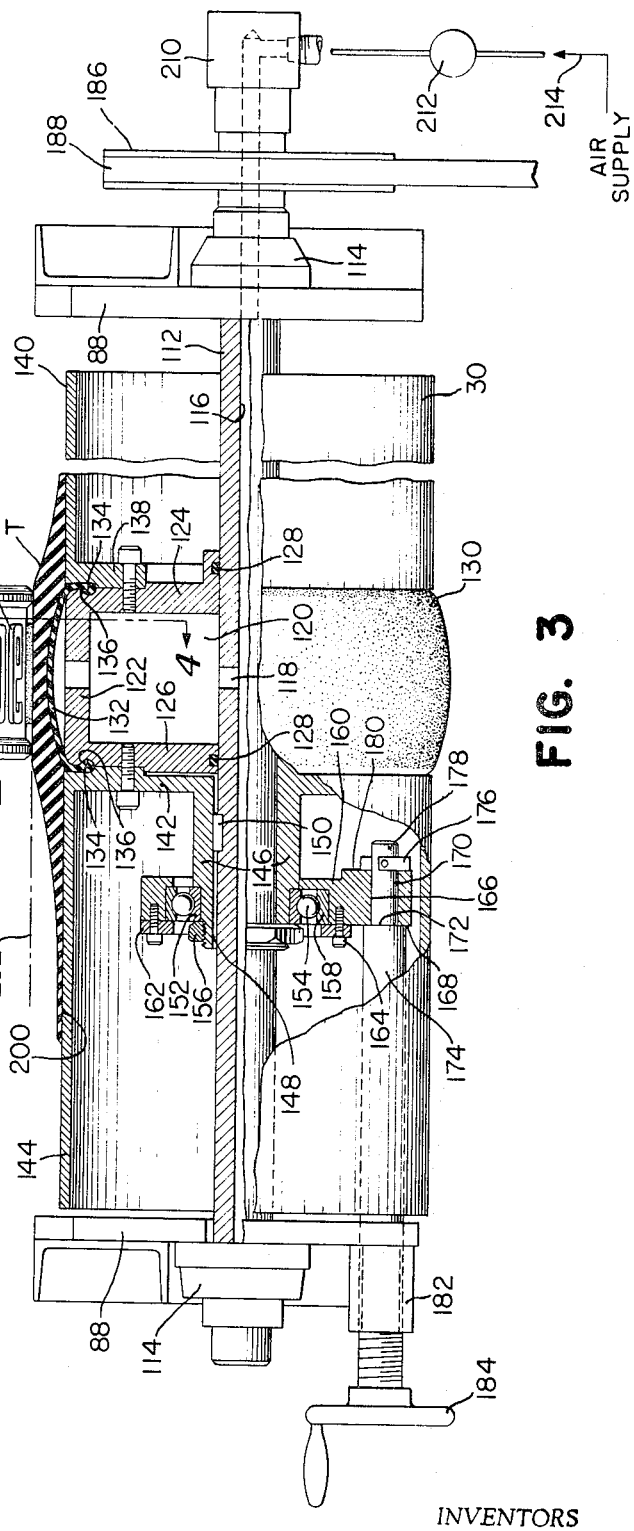
INVENTORS
TERRY L. BEALS
THEODORE F. GRIFFIN

TREAD MARKING DEVICE

The foregoing abstract is not to be taken as limiting the invention of this application, and in order to understand the full nature and extent of the technical disclosure of this application, reference must be made to the accompanying drawings and the following detailed description.

This invention relates to the manufacture of pneumatic tires, and particularly to applying identification marking to tread stock for tires which marking is readable during the manufacturing process and at least until the tire, including the identified tread, begins its intended service.

The increasing number and diversity of tires now being manufactured has increased the demand for improved methods of maintaining correct identity of groups of tires, and particularly of the tread stock which forms a part of the completed tire.

It is conventional in present tire manufacturing practice to supply tread stock in indefinite running lengths and of cross-sectional size and shape which is carefully predetermined so as to provide the tread portion of a tire. The tread stock is usually extruded and may include stock to provide the tire sidewalls as well as the tread portion. Extruded tread stock is customarily flat on its underside, which is the side which will be adhered to the tire carcass in the course of constructing the raw or uncured tire. The upper surface of the extruded tread stock strip of the type with which the present invention is concerned has a transverse profile characterized by a pair of parallel spaced raised humps or shoulders so-called because the additional rubber of the humps provides the shoulders of the finished tire, and by a transversely curved, depressed or reduced concave portion intermediate the shoulders from which the crown portion of the finished tire is developed when the tire is shaped to its final form. The crown or intermediate portion between the humps is generally curved so as to be concave upward.

Because of the described shape of the extruded tread stock, it has not heretofore been feasible to print large readable symbols or characters on the tread stock. Small letters or numbers applied in the narrow central portion of the crown surface have been used but such small characters have been found to become distorted beyond satisfactory recognition, or even completely lost when the tire having the marked tread is expanded to its final shape, or when the tread pattern is impressed therein in molding.

The present invention has for its principal object the provision of a system for applying a large readable identification marking to uncured tread stock, preferably still hot from the extrusion process and which marking is repeated along the tread stock length and can extend from shoulder to shoulder of a tire or at least across a major part of the width of the crown portion between the shoulders, and which marking will continue to be readable at least until the tire begins its intended service.

Other objects, features and advantages of the present invention will become apparent or be particularly pointed out in connection with the detailed description herein of a presently preferred embodiment and which description throughout makes reference to the accompanying drawings, in which:

FIG. 3 is a transverse elevational view taken along the line 3-3 of FIG. 2, parts being broken away to show interior structure;

FIG. 3a is an enlarged view of a portion of FIG. 3;

FIG. 4 is a partial side elevational view taken along the line 4-4 of FIG. 3;

Figure 1:
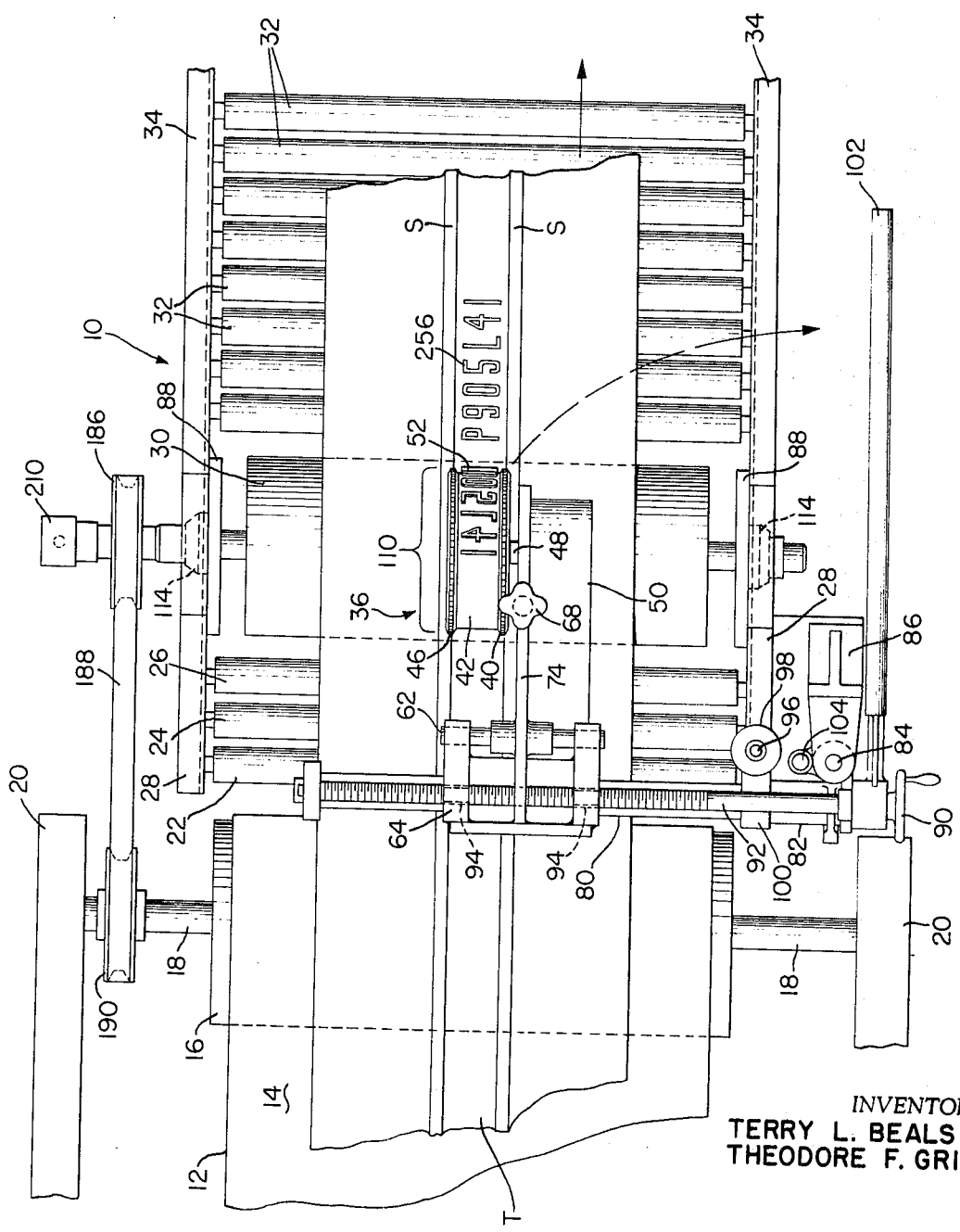
FIG. 1 is a plan view of apparatus according to the instant invention.
Figures 2, 5, 6:
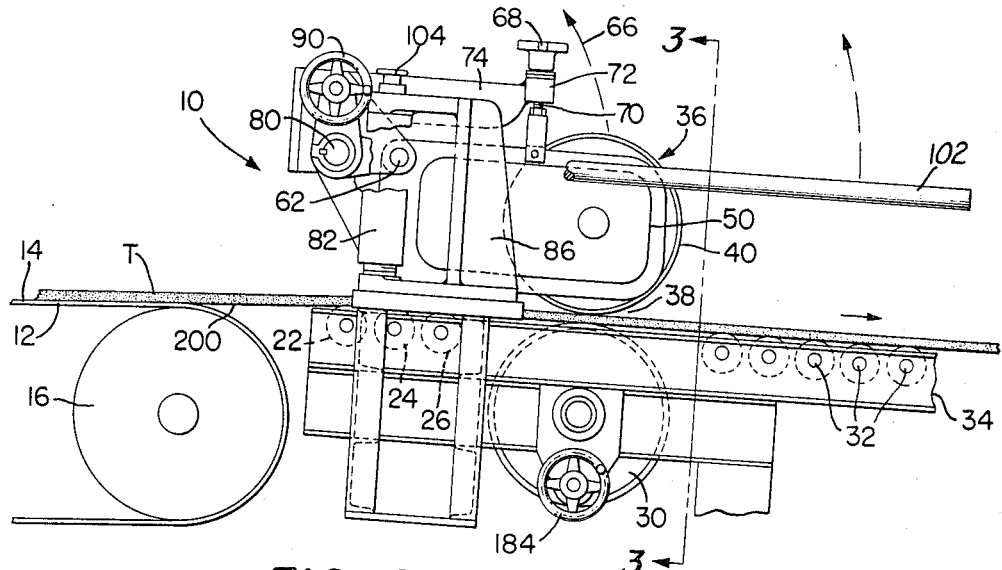
FIG. 2 is a side elevational view of the apparatus of FIG. 1.
FIG. 5 is a view of an uncured tire illustrative of a feature of the instant invention.
FIG. 6 is a view of a completed tire further illustrating a feature of the instant invention.

The attached drawings, and particularly FIGS. 1, 2 and 3 show tread marking apparatus 10 according to the instant invention, which apparatus receives tread stock T from a supply means which includes a conveyor 12 carrying stock on a flat belt 14 for receiving tread stock from an extruder, and mounted on the frame members 20. The advancing tread stock T is carried on support means in the form of the idler rollers 22, 24, 26 mounted rotatably in frame 28 and thence over a backing roll 30, continuing its forward movement therefrom on discharge means such as the rollers 32 of a roller conveyor 34 to subsequent processing.

Overlying the back-up roll 30 is a printing wheel assembly 36 which forms a printing nip 38 with the roll 30. The printing wheel assembly 36 includes a wheel 40 having a cylindrical surface 42 adapted to carry alpha numeric characters 44 attached to its surface by adhesives, or by other suitable means, and a pair of knurled drive rings 46 spaced apart a suitable distance to engage the tread stock T to be printed, notably at the shoulders. The wheel 40 itself is mounted for rotation on and with a shaft 48 cantileverly supported in the housing 50. Suitable engagement of the drive rings 46 with the tread T insures a rotation of the printing wheel 40 such that the printing surface 52 of the characters moves with a surface speed matched to the surface speed of the advancing tread stock T. The characters 44 have a printing or ink transfer surface 52 disposed at the surface of a cylinder coaxial with the printing wheel and approximately equal in diameter to the diameter of the drive rings. The housing 50 also supports cantilever shafts 54 and 56 which carry respectively an ink transfer roll 58 and an inking roll 60. By suitable gearing or the like, the shafts 48, 54, 56 are maintained in substantially timed relation so that respective surfaces of the rollers 58, 60 and printing surface 52 of the printing wheel 40 are in nonslip ink-transfer contact. FIG. 4 illustrates the arrangement of the printing apparatus 36 in cross section. Rotation of the wheel 40 in timed relation with the movement of the tread stock transfers ink from the printing surface of the characters 44 to the surface of the tread stock T. An ink supply in the form of a fountain 45 supplies ink of suitable color to the surface of the rotating inking wheel 60 from which surface ink is transferred to the ink transfer roll 58 and is in turn transferred to the surface 52 of the printing characters 44. The printing assembly 36 is pivotably supported in the apparatus by a hinge pin 62 secured in a bracket 64 and can be raised or lowered through a small angle, as indicated by the arrow 66 of FIG. 2, for fine adjustment of the wheel 40 toward or away from the tread stock, by turning the knob 68 which is threaded on a screw 70 extending through a boss 72 on the arm extension 74 of the bracket 64, so as to engage the clevis 76 coupled by a pin 78 to the housing 50 of the printing assembly 36.

The bracket 64 which carries the printing assembly 36 is mounted for sliding movement along a cantilevered arm 80 extending from a swing member 82 swingably supported on an upright pin 84 secured in the stand 86 in fixed spaced relation to the frame member 88 on which the roll 30 is mounted. The bracket 64 and the printing assembly 36 may be moved along the arm 80 in order to position the printing wheel 40 transversely with respect to the tread stock T by a hand wheel 90 and screw 92 rotatably carried in the member 82 and suitably engaging the bracket 64 as by means of the tapped holes 94 therein.

In order to adjust the spacing of the printing nip to accommodate variations in thickness from one tread stock to another, or to elevate the printing assembly 36 clear of the tread stock T, the supporting cantilevered arm 80 is rotatable in the swing member 82 by movement of the adjusting screw 96 and knob 98 carried by a crank arm 100 affixed to the support arm 80, or by the hand lever 102. Either or both movements may, of course, be provided by other suitable means. The cantilevered arm 80 is locked in its horizontal transverse position by a detent pin 104 carried by the stand 86 and engaging a depression (not shown) in the swing member 82. Release of the detent from its engagement with the depression permits the support arm 80 with the printing assembly 36 thereon to be swung horizontally clear of the printing zone 110 and any tread stock T therein. It becomes necessary or advisable on occasion to stop the movement of tread stock through the printing apparatus. Certain tread stocks are sufficiently tacky that at least a slight separation between the roll 30 and the underside of the tread stock T should be made. This is conveniently accomplished by slightly elevating the rolls 26 by any convenient means (not shown). The printing wheel is also moved away from the tread stock.

The means for altering or displacing the transversely curved surface of the tread stock is shown in greater detail in FIG. 3 and according to the invention includes the roll means 30 which is mounted slidably axially on and for corotation with a shaft 112 supported by bearings 114 suitably carried by frame members 88 which are advantageously arranged for expeditious removal of the roll assembly 30. The shaft 112 is provided with a central passage 116 and a port 118 through which fluid may be admitted to or released from the chamber 120 formed in part by a perforate shell 122 and the roll heads 124, 126 suitably bored to receive the shaft 112 and fluid pressure sealing means, such as the O-rings 128. The chamber 120 is further defined and enclosed by the generally cylindrical bladder or elastic membrane 130 coaxially secured to the roll heads 124, 126. The membrane 130, of rubber or the like, includes cord reinforcement 132, FIG. 3a, the cords of which extend generally parallel to the axis of the cylindrical membrane and of the roll on which it is mounted. The cords make angles of approximately 88° with edge enlargements or beads, 134, one at each of the terminal circular edge portions of the membrane. The cord angle of 88° with the beads of the membrane provides both convenience in fabricating the membrane and satisfactory ability in the membrane to expand or distend radially with low pressure of the inflating fluid. Lesser cord angles may be used in the reinforcing ply or plies within the membrane, a practical minimum angle being about 45°. The decreased angle enables greater radial expansion. The beads 134 are secured in circular grooves 136 disposed annularly in the heads 124, 126 of the roll and are clamped respectively by the head 138 of the roll shell extension 140 and the head 142 of the roll shell extension 144 in the respective grooves 136 in the heads 124, 126 of the roll 30.

To enable lateral position adjustment of the roll 30 with respect to the tread stock T the extension head 142 is provided with a hub 146 extending around and along the roll shaft 112, which hub had an internal longitudinal keyway 148. A key 150 feathered in the shaft 112 permits axial movement, but prevents relative rotation between the roll 30 and the shaft 112. The hub 146 carries one race 152 of an antifriction bearing 154 and a bearing lock nut 156; the outer race 158 of the bearing 154 is secured in a thrust plate 160 by the ring 162 and cap screws 164. In the thrust plate 160 a bore 166 and a face 168 receive respectively a journal 170 and a shoulder 172 of a screw 174. A collar 176 is pinned to the outer end 178 of the journal 170 so as to bear on the face 180 of the thrust plate 160. The thrust screw 174 is engaged by a screw thread in a boss 182 secured to the frame member 88 and is provided with a hand wheel 184 by which, as will be apparent in FIG. 3, the position of the roll 30 may be adjusted in an axial direction transverse to the direction of movement of the tread stock T.

The roll 30 is provided with drive means including the shaft 112 and belt pulley 186 thereon which preferably is of the variable pitch diameter type so as to permit adjustment of the surface speed of the roll 30 with respect to the conveyor 12 and the tread stock supply means. A belt 188 wrapping the pulley 186 is driven by a pulley 190, mounted on the conveyor pulley 16 and rotated thereby.

The backup roll 30, according to the invention, includes means engageable with the undersurface of the tread stock T, and capable of altering or displacing the transverse profile of the upper surface of the tread stock T to be printed from its transversely curved surface as extruded to a substantially flat level surface or profile 202 across the tread stock at least in the printing zone 110 and preferably from one to the other of shoulders S of the tread stock T. In the present embodiment the said means takes the form of a roll 30 having the bladder or membrane 130 which is at least circumferentially elastic. A pressurized fluid within the chamber 120 acting upon the inner surface of the membrane 130 is thus able to distend the membrane and to apply a generally uniformly distributed pressure to the lower surface 200 of the tread stock T such that its outer or upper surface is altered or displaced and brought into printing engagement with the printing surface 52 of the characters 44 on printing wheel 40 and into substantially nonslipping rolling contact with the drive rings 46 thereof. A fluid such as air under superatmospheric pressure is admitted into or out of the chamber 120 by means of port 118 and passage 116 in the roll shaft 112, a rotary union connection 210 and a pressure regulating device 212, from a fluid pressure supply 214. Liquids, such as water, may also be used to provide the desired fluid pressure. The actual pressure supplied is adjustable to accommodate variations in thickness, weight and stiffness of various tread stocks; however, it has been found in practice that adjustment of pressure will not be required except for large variations in tread stock. Pressures of from two-tenths to about 1 atmosphere, gage pressure, have been found satisfactory. Higher pressures may, of course, be used.

The printing wheel 40 is driven by the engagement of the tread stock T with the lightly knurled drive rings 46 in the manner previously described. With tread stocks of great thickness or stiffness, it may be found that the tread stock T is pressed upward into harder engagement with the drive rings 46 such that there is cooperation between the drive rings 46 and the membrane 130 to provide the desired flat profile 202 of the upper surface of the tread stock T.

It is preferred that the apparatus be located close to a stock extruder or tuber (not shown) so that the tread stock T retains heat generated in it by its extrusion. The tread stock is in this condition approximately 200°F., or about 90 to 95°Cel. In such condition the tread stock is normally quite plastic and it is an advantage of the instant invention that the tread stock profile can be altered in the printing zone without permanent distortion of the desired tread cross section. Moreover, the residual heat sets the ink of the printed characters. Because of the plasticity of the tread stock the nip formed by the printing wheel 40 and the roll 30 is adjusted to receive and to pass the tread stock being printed with substantially no squeezing of the tread stock. Rather, only light contact is used, sufficient to provide for suitable transfer of the ink being used from the printing surfaces of the characters to the surface of the tread stock. After leaving the printing nip, the tread stock recovers its cross-sectional shape and profile. As previously mentioned, the roll means 30 is driven in timed relation with the tread stock T supply means, the timed relation being provided by the belt 188 and the pulleys 186, 190, at least one of which is of variable pitch diameter, such that the speed relationship therebetween can be precisely adjusted.

FIG. 5 illustrates a tire 250 in generally cylindrical form. The tire includes the conventional bead portions 252 and a carcass 254 over which is applied a finite length of tread stock T having the profile previously described. Notably the characters 256 shown in FIG. 5 are of sufficient height to extend nearly from one to the other of shoulders S despite the concavity of the crown portion 258 of the tire T in its flat band or cylindrical state. The characters themselves are appreciably distorted but are nevertheless clearly readable.

In FIG. 6 there is shown a tire 260 having markings applied in accordance with the invention. Inspection of FIG. 6 and comparison thereof to FIG. 5 illustrates the marked change in height and width of each of the characters 262 applied by the apparatus described herein above. The shaping of a pneumatic tire from its flat band state, FIG. 5, to its full toroidal shape, shown in FIG. 6, induces a very significant expansion in the circumference of the crown region 264 of the tire and a decrease in the width of the tread portion lying between the shoulders. The printing characters employed are proportioned to compensate for the changes in circumferential length of the tire and in transverse width of the crown or tread portion so as to yield an identification number on the finished tire which is pleasing in form and of sufficient size to prevent its being obscured or obliterated by the change in shape or by the impression of the tread pattern in the tread during the molding thereof. The proportioning of the printing characters also insures that despite the unusual height and width the characters will be usefully legible to identify the uncured tread stock in its indefinite running length, as well as in the subsequent operations prior to the curing of the finished tire. Symbols applied in accordance with this invention thus remain fully useful from the time they are applied to the uncured tread stock throughout the processing and distribution and the marking will persist until it is worn away by actual road use.

While certain representative embodiments and details have been shown for the purpose of illustrating the invention, it will be apparent to those skilled in this art that various changes and modifications may be made therein without departing from the spirit or scope of the invention.

We claim:

1. In an apparatus for printing symbols on a transversely curved surface of an indefinite running length of uncured tire tread stock having a transversely spaced pair of shoulders extending therealong, the apparatus including printing means and means for carrying said tread stock in a direction generally parallel to the length thereof into operative association with the printing means, the improvement comprising means engageable in rolling contact with said tread stock to raise continuously successive portions of said transversely curved surface relatively with respect to said shoulders to a generally transversely flat surface engageable with said printing means to receive printed symbols thereon.

2. Apparatus as claimed in claim 1 wherein the last said means is engageable with the surface opposed to said curved surface of said tread stock and comprises roll means rotatable about an axis fixed transversely of said length, said roll means including a generally cylindrical elastically deformable member.

3. Apparatus as claimed in claim 2, wherein said roll means includes a fluid-receiving chamber and said member comprises an elastic membrane defining a wall of said chamber, and fluid-conducting means in fluid communication with said roll means for supplying fluid at predetermined superatmospheric pressures to said chamber.

4. Apparatus as claimed in claim 3, wherein said membrane is provided with enlarged annular beads at the edges thereof, said roll means having a shaft member and a pair of heads disposed coaxially of and spaced axially along said membrane, said heads each having an annular groove receiving one of said heads therein, and reinforcing cords extending in said membrane from bead to bead thereof to resist longitudinal extension of said membrane.

5. Apparatus as claimed in claim 2, wherein said roll means comprises a pair of roll heads, a fluid-receiving chamber intermediate said heads, a generally cylindrical elastic membrane disposed coaxially of and extending from one to the other of said heads, and a roll shell extension member extending coaxially and axially outwardly of said membrane.

6. Apparatus as claimed in claim 2, comprising drive means including a roll shaft member mounted coaxially of and for corotation with said roll means and drivably connected to stock supply means, whereby said roll means is rotatable in positively timed relationship to said supply means.

7. Apparatus as claimed in claim 2, including means for effecting relative lateral movement between said roll means and said tread stock, said roll means including a roll shaft member mounted corotatably and coaxially with said roll means.

8. Apparatus as claimed in claim 2, said curved surface including a pair of parallel spaced shoulders thereon, said apparatus further comprising means for receiving tread stock from tread stock supply means, said roll means being mounted for rotation about an axis transverse to the direction of movement of said tread stock and engageable with said stock moving thereover, drive means for driving said roll means in timed relation to the first said means, printing means including ink supply means, a printing wheel having symbol printing characters the printing surfaces of which define a cylindrical surface, said wheel being rotatable about an axis parallel to the first said axis and spaced therefrom so as to form a printing nip between said cylindrical surface and said roll means, said roll means including a generally cylindrical elastic membrane engageable in rolling contact with the surface of said stock moving thereover and coaxially secured to said roll means and forming with said roll means an elastic fluid containing chamber therein, fluid-conducting means in communication with said chamber for supplying a predetermined fluid pressure in said chamber and against said membrane, whereby said pressure is operative to distend said membrane radially and to alter the said transversely curved surface in said nip to a substantially flat profile in printing contact with said cylindrical surface.